Nov. 1, 1949 G. C. NICHOLAS 2,486,869
BALL POINT FOUNTAIN PEN
Filed April 7, 1948

INVENTOR.
George C. Nicholas.
BY Chas. T. Hawley
ATTORNEY

Patented Nov. 1, 1949

2,486,869

UNITED STATES PATENT OFFICE 2,486,869

BALL-POINT FOUNTAIN PEN

George C. Nicholas, Worcester, Mass.

Application April 7, 1948, Serial No. 19,472

2 Claims. (Cl. 120—42.4)

This invention relates to fountain pens of the type in which the pen point is in the form of a small steel ball.

It is the general object of this invention to provide improved magnetic means for retaining the ball in place in the pen-holder or body.

Another object is to provide a construction in which the flow of ink to the ball point is free and not obstructed by the magnetic means.

My invention further relates to arrangements and combinations of parts which will be hereinafter described and more particularly pointed out in the appended claims.

A preferred form of the invention is shown in the drawings, in which

Figure 1:
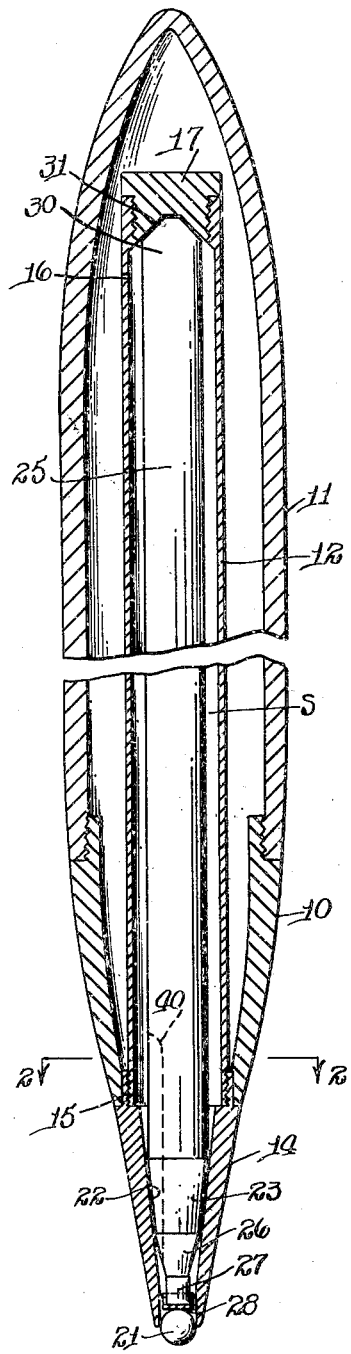
Fig. 1 is a sectional front elevation of a fountain pen embodying my invention.

Referring to the drawings, my improved pen comprises a body portion 10, a top portion 11, an inner tube 12 and a tip 14. The tip 14 is preferably of non-magnetic material, such as brass, copper or plastic, and is firmly seated in the lower end of the body portion 10. The tube 12 is correspondingly threaded at 15 into the upper end of the tip 14.

The usual vent hole may be provided at 16 and the upper end of the tube 12 is closed by a cap 17 which is threaded therein.

The tip 14 (Fig. 3) has a short cylindrical axial opening 20 at its lower end which is adapted to closely engage a small steel ball 21 which is the marking instrumentality. The tip 14 also has a tapered or conical axial portion 22 which receives the tapered lower end 23 of a permanent bar magnet 25.

A more sharply conical lower end portion 26 of the magnet 25 terminates in a reduced extension 27 which has a brass or non-magnetic cap 28 directly engaging the inner surface of the ball 21. The ball is retained in position by magnetic attraction. At its upper end, the magnet 25 has a tapered end portion 30 which is received and centered in a correspondingly tapered recess 31 in the lower face of the cap 17.

The parts are so proportioned that when the cap 17 is fully seated in the tube 12, the bar magnet 25 will be centered at both ends by the tapered recess 31 in the cap 17 and the tapered portion 22 of the tip 14.

When the bar magnet 25 is thus firmly supported, the extension 27 and cap 28 will be positioned to engage the ball 21 and to hold the ball in correct position for marking or writing. Preferably about one-half of the ball extends below the end of the tip 14.

Figure 2:
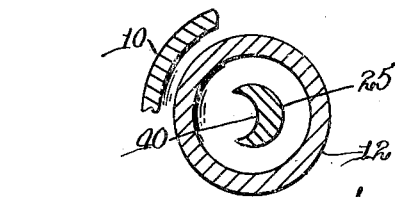
Fig. 2 is a cross section thereof, taken along the line 2—2 in Fig. 1.
Figure 3:
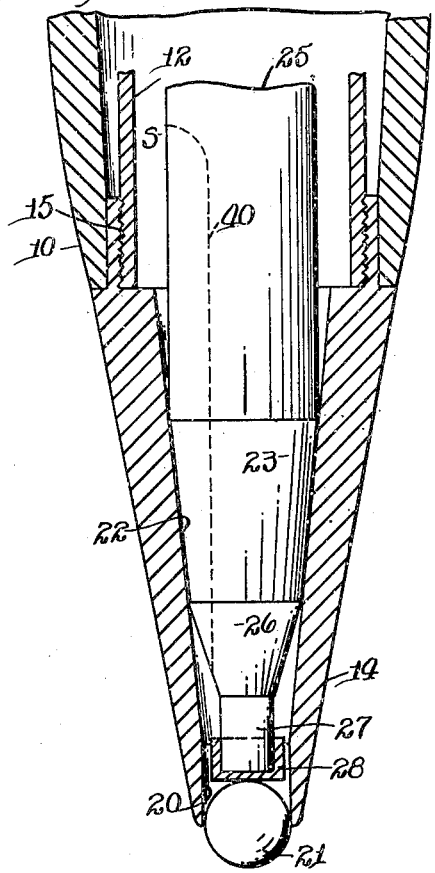
Fig. 3 is an enlarged sectional elevation of the lower portion of the pen shown in Fig. 1.

An annular space S around the magnet 25 provides ink storage. The magnet 25 is preferably deeply grooved on one side of its lower end, as indicated at 40 (Fig. 2), to provide passage for the ink below the seating surfaces 22 and 23 (Fig. 3).

For filling purposes, the top portion is removed to give access to the cap 17 which is then also removed.

Tests of a pen constructed as above described show that a ball thus retained by magnetism only is well adapted for writing purposes. It is obvious that all parts are simple and are very quickly and easily assembled.

If it is desired to remove the ball 21 for cleaning or replacement, this may easily be done by using a second and stronger magnet to withdraw the ball from the tip 10.

Having thus described my invention and the advantages thereof, I do not wish to be limited to the details herein disclosed, otherwise than as set forth in the claims, but what I claim is:

1. A ball point pen comprising a tubular body portion having an outwardly contracting inner passage and a restricted end outlet, a small steel ball fitting said outlet, and a permanent bar magnet mounted in said body portion and attracting and holding said ball in said outlet and in writing position, the lower end of said bar magnet being tapered and being firmly seated in said contracting inner passage and being centered and aligned thereby, and said bar magnet having a groove extending lengthwise through its seated portion and providing a passage through which ink may flow from above said body portion to said ball point.

2. A ball point pen comprising a tubular body portion having an outwardly contracting inner passage and a restricted end outlet, a small steel ball fitting said outlet, a tube fixed to said body portion, a permanent bar magnet mounted within said tube and seated in said body portion and attracting and holding said ball in said restricted outlet and in writing position, the upper end of said bar magnet being tapered, and a cap mounted on and closing the upper end of said tube and having a tapered recess in its inner face to receive the tapered upper end of said bar magnet and being effective to retain said bar magnet in axial, ball-positioning location and to hold said bar magnet from lateral or longitudinal displacement.

GEORGE C. NICHOLAS.

REFERENCES CITED

The following references are of record in the file of this patent:

UNITED STATES PATENTS

| Number | Name | Date |
|---|---|---|
| 291,925 | Morton | Jan. 15, 1884 |
| 1,033,868 | Bodde | July 30, 1912 |
| 2,239,970 | Osborne | Apr. 29, 1941 |
| 2,390,636 | Biro | Dec. 11, 1945 |

FOREIGN PATENTS

| Number | Country | Date |
|---|---|---|
| 2,939 | Great Britain | 1911 |
| 5,567 | Great Britain | 1884 |